United States Patent [19]

Hayashi et al.

[11] Patent Number: 5,017,333
[45] Date of Patent: May 21, 1991

[54] MULTI-REGION REACTOR CORE PEBBLE BED HIGH TEMPERATURE GAS REACTOR

[75] Inventors: Takao Hayashi; Masao Yamada, both of Kanagawa, Japan

[73] Assignees: Japan Atomic Power Co., Ltd.; Fuji Electric Co., Ltd., both of ; JPX

[21] Appl. No.: 475,693

[22] Filed: Feb. 6, 1990

[30] Foreign Application Priority Data

Feb. 8, 1989 [JP] Japan .................................. 1-29238
Nov. 14, 1989 [JP] Japan ................................. 1-295202

[51] Int. Cl.$^5$ ............................................. G21C 15/00
[52] U.S. Cl. .................................. 376/382; 376/265; 376/266; 376/458; 376/459
[58] Field of Search ............... 376/381, 382, 265, 266, 376/458, 459

[56] References Cited

U.S. PATENT DOCUMENTS

| | | | |
|---|---|---|---|
| 3,228,852 | 1/1966 | Holmes et al. | 176/58 |
| 3,287,910 | 11/1966 | Silverstein | 176/59 |
| 3,321,376 | 5/1967 | Machnig et al. | 176/59 |
| 3,867,253 | 2/1975 | Gratton et al. | 176/40 |
| 4,795,607 | 1/1989 | Reutler et al. | 376/299 |
| 4,816,212 | 3/1989 | Bodmann et al. | 376/381 |

Primary Examiner—Brooks H. Hunt
Assistant Examiner—Nina Bhat
Attorney, Agent, or Firm—Brumbaugh, Graves, Donohue & Raymond

[57] ABSTRACT

A multi-region reactor core pebble bed high temperature gas reactor comprises a pebble bed reactor core housed within a pressure vessel and charged with spherical fuel. The reactor core is surrounded by a reflector wall comprising a partition wall which partitions the reactor core into a plurality of reactor core sub-regions. The reflector wall comprises a plurality of layers of reflector blocks, adjacent blocks of a layer being secured against one another by removable tapered keys wedged therein between.

2 Claims, 2 Drawing Sheets

MULTI-REGION REACTOR CORE PEBBLE BED HIGH TEMPERATURE GAS REACTOR

BACKGROUND OF THE INVENTION

The present invention relates to the construction of a multi-region reactor core pebble bed high temperature gas reactor. In a gas reactor of this type, the reactor core is formed by using spherical fuel produced by dispersing coated fuel particles in a graphite matrix and hardening the particles by burning in spheres each having a diameter of approximately 6 cm. This type of reactor has features that permit refueling during operation and is also characterized by high temperature heat supply, high inherent safety, high degree of burn-up of fuel and so forth, and the development thereof is being advanced in various countries.

At present, the development of the pebble bed high temperature gas reactor is tending toward to types, a monolithic type and a modular type.

The monolithic type pebble bed reactor is constructed by assembling a pebble bed reactor core, a reactor core portion of a graphite reflector, and principal equipment such as a refueling device, a control rod, a gas circulator and a steam generator in a prestressed concrete pressure vessel having a single cavity. In West Germany, a prototype reactor (THTR) on a scale of electric power at 300 MW is already in test operation, and a project of a plant (HTR-500) on a scale of 500 MW is also being promoted.

On the other hand, in the modular type pebble bed reactor, design items of the reactor core such as the core size, thermal power density and heavy metal charging quantity per fuel sphere are selected so as to further increase the inherent safety. The modular type pebble bed reactor has a module construction in which a pebble bed reactor core and primary principal apparatus are housed in a steel pressure vessel to thereby unite them in a unit after limiting the diameter of the reactor core to such a diameter (approximately 3 mm) that makes it possible to shut down at low temperature only by simply inserting a control element into the reflector region (an interior of the reflector itself). The output, however, is comparatively small, and the electric power of a single reactor is at approximately 80 MW.

However, there are problems in the above-mentioned monolithic and modular type pebble bed reactors.

In the monolithic type pebble bed reactor, the dimension of the reactor core diameter becomes large, and nuclear control for a large-sized reactor having a large output scale is insufficient in a cooled state using only control elements (control rod, boron sphere) inserted into the reflector region. Furthermore, a reactor core control rod, which is forcibly inserted directly into the reactor core, is required in addition to the control elements inserted into the reflector region by gravity drop only. Moreover, cases have been reported that fuel spheres are broken if the control rod is inserted forcibly into the core because the pebble reactor core is full of fuel spheres accumulated inside the reactor core, which causes a serious drawback.

Another problem is that a supporting structure for supporting the load of the top reflector is troublesome in a reactor of large power scale because the top reflector, manufactured with graphite blocks, becomes increasingly large as the diameter of the reactor core becomes larger. This, in turn, requires a troublesome structure for supporting the top reflector by suspending it from the ceiling of a concrete pressure vessel.

In the case of building the reactor in sites where an earthquake may be probable, it is more difficult to attain the structure for supporting the top reflector in terms of design.

In a modular type pebble bed reactor, the reactor can be stopped at low temperatures without requiring the insertion of the control rod into the reactor interior, thereby obviating the foregoing problems peculiar to the monolithic type reactor. On the other hand, it is required to have the modular type pebble bed reactor correspond as a multi-module plant where a plurality of sets of modular type reactors are arranged in order to form a plant of large output scale since the output of a single set is as low as approximately 80 MW. However, with numerous modular type reactors in the same site, the equipment assumes a large configuration for the required output scale. This in turn causes economic disadvantages as well as problems with site availability.

The side reflector constituting the core frame of the pebble bed reactor is constructed typically of graphite blocks, and hence there is a possibility of damage to the reflector blocks due to thermal deformations when effecting excessive irradiations of high-speed neutrons during the operation of the reactor. If damaged, however, the prior art devices do not provide any particular means for replacing or repairing the damaged reflector blocks by remote control from outside of the reactor. This situation is likely to be a critical problem in terms of safety and supervision, which is to be solved from now on into the future.

Accordingly, it is a primary object of the present invention to eliminate the foregoing problems pertaining to the nuclear controllability in the monolithic type reactor, by providing a novel pebble bed high temperature gas reactor capable of producing outputs of several hundreds of MW with a small-sized and compact configuration.

SUMMARY OF THE INVENTION

To obviate the above-mentioned problems, the pebble bed high temperature gas reactor of the present invention is constructed such that the reactor core region surrounded by a single side reflector is sectioned into a plurality of core sub-regions by means of a partition wall constructed of reflector blocks. The side reflector and the partition wall are constructed to be an integral block layered structure of graphite reflector blocks key-joined to each other. Interblock restricting means releasable by an operation from outside are incorporated into some of the reflector blocks.

According to the construction described above, the reactor body itself resembles a single set of monolithic type reactors in appearance, and, from the operations aspect, performs a function similar to a multi-modular type reactor formed by combining a plurality of modular type reactors.

The principal design features with respect to the claimed plurality of sectioned sub-regions are substantially the same as those for the foregoing modular type reactor. This design eliminates the necessity for inserting the control rod directly into the reactor interior as in the case of the modular type reactor to effect the nuclear control, particularly to stop the reactor at low temperatures. The reactor can be stopped at low temperatures simply by inserting the control elements into the reflector and the reflector partition wall by which the respective core sub-regions are sectioned. Therefore, the possibility of damage to the fuel spheres caused by inserting the fuel rod forcibly into the fuel spheres filling the reactor core may be safely avoided. Furthermore, the top reflector can be arranged to be supported astride both of the side reflector and the partition wall of the reflector, thereby increasing a tolerance in design in terms of antiseismic properties.

The restricting means interposed between the reflector blocks in the above-described construction are provided in such a way that tapered keys are embedded into parts of certain reflector blocks arranged in the same block-layered row to obtain split-structure blocks. The tapered keys work as wedges in a constructive state of the reflector and act to keep the reflector in an assembled state by imparting forces between the reflector blocks so that the blocks push against each other. Whereas in removing the tapered keys by the operation from outside of the reactor, the forces by which the reflector blocks push against each other is removed, thereby releasing the restrictions therebetween. It is therefore possible to replace the damaged reflector blocks with ease by removing reflector blocks one by one outwardly of the reflector by remote operation by use of a crane or the like.

DETAILED DESCRIPTION OF THE PREFERRED EMBODIMENTS

Figure 1:
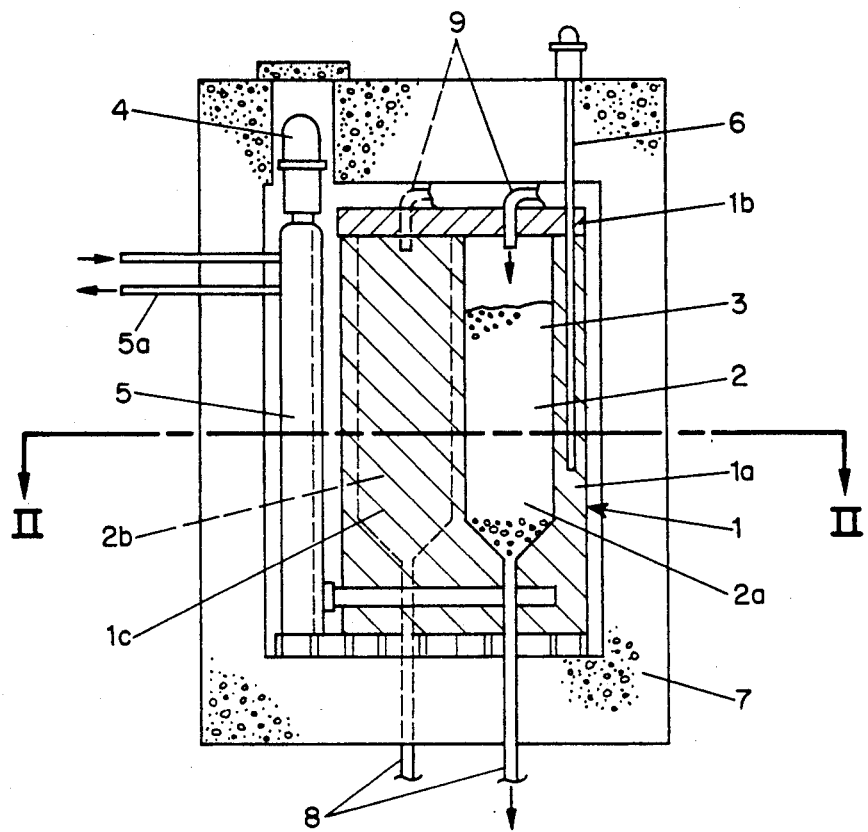
FIG. 1 is a vertical sectional view illustrating a construction of one embodiment of the present invention.
Figure 2:
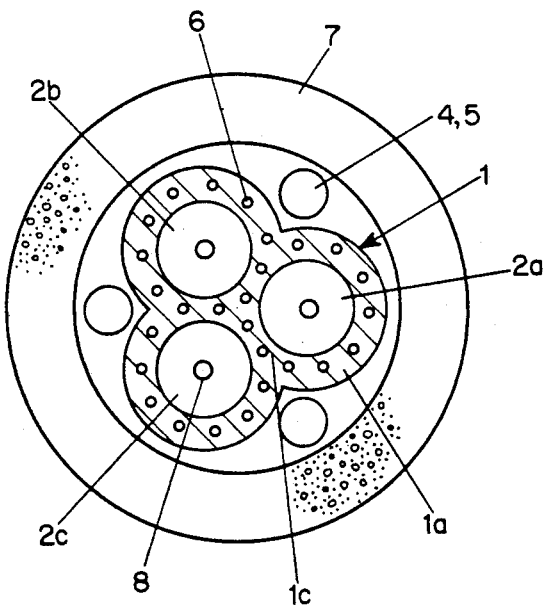
FIG. 2 is a cross sectional view taken along the line II—II of FIG. 1.

Referring to FIGS. 1 and 2, a pebble bed high temperature gas reactor constructed in accordance with the invention includes a reactor core 2 which is charged with spherical fuel pebbles or pellets 3. The reactor core is surrounded by a graphite reflector 1 which, in turn, is enclosed in a prestressed concrete vessel 7. Also contained in vessel 7 are a gas circulator 4 and a steam generator 5. Reflector control elements 6 are provided in the region of the reflector 1 for control and storage of the reactor.

Reflector 1 comprises a single generally cylindrical side reflector 1a which encircles the reactor core 2, a top reflector 1b and a graphite partition wall 1c integral with side reflector 1a for sectioning reactor core 2 into three core sub-regions 2a, 2b and 2c. Top reflector 1 is so constructed that the reflector 1b is supported outside by both side reflector 1a and partition wall 1c.

Each of the core sub-regions 2a, 2b and 2c of reactor core 2 defined by partition wall 1c, as described above, is provided with a respective independent refueling system including a fuel discharge pipe 8 extending from the bottom and a fuel charging pipe 9 at the upper part of the core region. Also, each core sub-region has its own installation of primary equipment, namely, a gas circulator 4 and a steam generator 5, all of which are uniformly distributed in the circumferential cavity disposed between the outer surface of reflector 1 and the inner surface of the pressure vessel 7. Each steam generator 5 has a secondary steam pipe 5a leading therefrom, as shown in FIG. 1.

The above-mentioned parameters such as the core diameter for respective core sub-regions 2a, 2b and 2c are selected substantially equal to those of the foregoing modular type pebble bed reactor. The reflector control rods 6 are dispersively located along the ambient area of the side reflector 1a and the partition wall 1c of the reflector as clearly shown in FIG. 2.

The thus constructed pebble bed reactor resembles a set of monolithic type reactors in appearance. However, the internal core of the reactor is sectioned into the plurality of core sub-regions 2a, 2b and 2c. With this arrangement, the pebble bed reactor is therefore equal in function to a multi-modular type reactor into which three sets of modular type reactors are combined.

Figure 3:
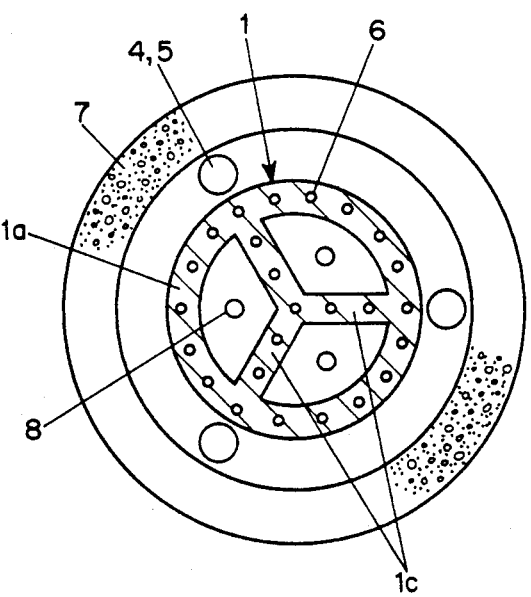
FIGS. 3 and 4 are cross sectional views each showing an applied example of the embodiment.
Figure 4:
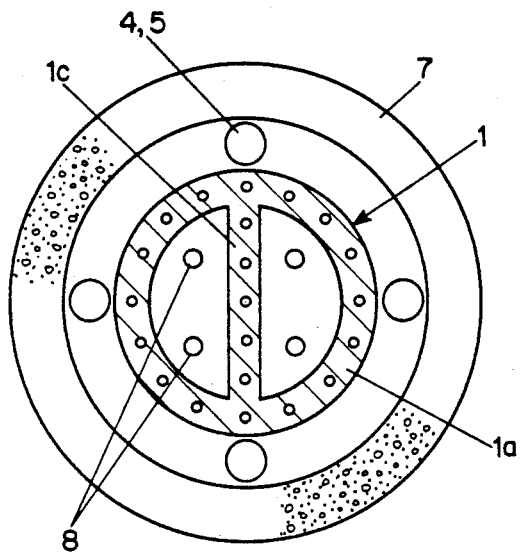

In the embodiments shown in FIGS. 3 and 4, the construction of the nuclear reactor itself is similar to the embodiment shown in FIGS. 1 and 2, except that the sectioning pattern of the pebble bed reactor core is modified. That is, instead of the core sub-regions 2a, 2b and 2c having a circular cross-section as shown in FIG. 2, and the side reflector 1a and the partition wall 1c constructed so as to surround the ambient area of the three core sub-regions, in the FIG. 3 embodiment the three core sub-regions 2a, 2b and 2c, each have a sector shape in section and are defined by a Y-shaped partition wall 1c positioned inside a side reflector 1a. The side reflector 1a has a circular shape in section. The embodiment shown in FIG. 4, has two core sub-regions 2a and 2b each having a semi-circular shape in section.

Figure 5:
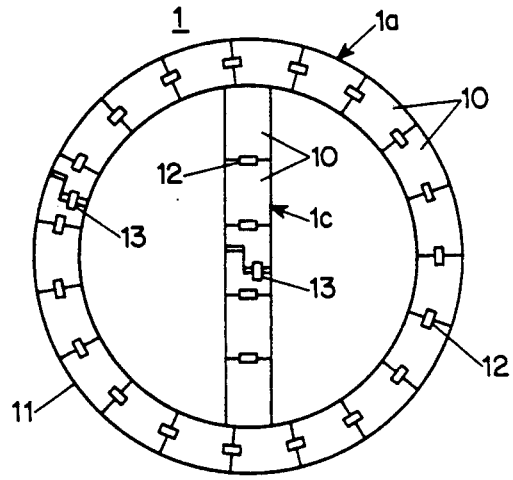
FIG. 5 is a plan view showing one layer of blocks of the reflector of FIG. 4.
Figure 6:
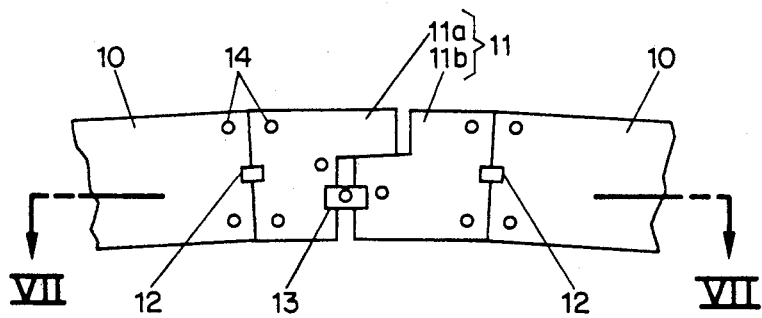
FIG. 6 is an enlarged view of a portion of FIG. 5.
Figure 7:
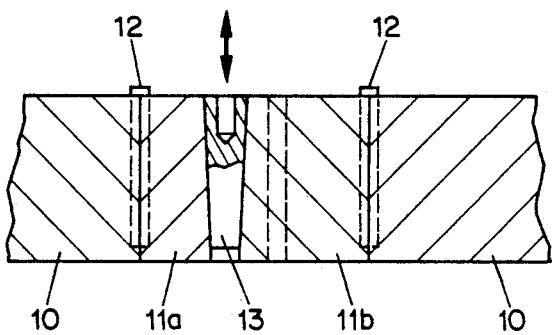
FIG. 7 is a sectional view taken along the line VII—VII of FIG. 6.

Turning next to FIGS. 5 to 7, there is shown a specific construction of the side reflector and the partition wall of the two core sub-regions of the pebble bed reactor shown in FIG. 4. To be specific, an annular side reflector 1a and a tabular partition wall 1c are both constructed in the form of an integral block-layered structure obtained by combining straight-sided graphite reflector blocks 10 and curved graphite blocks 11 and joining them to each other by keys 12. Among these blocks, are split-structure blocks 11 used for releasing the framework of the reflector. Embedded between split-blocks 11a and 11b are wedge-like tapered keys 13 defined as restricting means, thus forcibly keeping the reflector 1 in an assembled state so that the keys act between the reflector blocks 10 and 11 to cause their split-blocks to push against one another. Note that the numeral 14 designates a bolt hole, perforated in each of the reflector blocks 10 and 11, for suspending the block.

Based on this construction, the tapered key 13 is driven between the split-blocks 11a and 11b of the reflector block 11 in a state where the reflector is assembled, as a result of which the restrictive phase is developed between the reflector blocks 10 and 11 to keep the constructive state. Whereas if the tapered key 13 is pulled out in this state, the restriction by which the reflector blocks 10, 11 are pushed against each other is released.

Therefore, if the graphite reflector blocks 10, 11 are partly damaged due to thermal deformations caused by excessive irradiation of high-speed neutrons, the tapered keys 13 are pulled out of the split-structure reflector blocks 11 for decomposing the framework with respect to the side reflector 1a and the partition wall 1c by the remote operation upwardly of the reactor. In this state, the remote operation is performed by use of a crane or the like from outside of the reactor, thereby removing the reflector blocks one by one. Thus, the damaged reflector blocks can be easily replaced.

The pebble bed high temperature gas reactor constructed in the manner described above according to the present invention exhibits the following effects:

By virtue of a plurality of core sub-regions into which the interior of a set of reactor is sectioned, there is obtained a pebble bed high temperature gas reactor which resembles the monolithic type reactor in appearance and is equal in function to the multi-modular type reactor constructed by combining a plurality of modular type reactors. As a result, it is possible to construct the reactor in a smaller-sized and more compact configuration than a plant having a large scale output which is constituted by arranging a plurality of independent modular type reactors as in the case of the prior art multi-modular type reactor. This in turn provides efficient utilization of a sites for a nuclear reactor plant and leads to a reduction in the manufacturing costs.

The reactor operation can be halted at low temperatures simply by inserting the control elements into only the reflector region which encircles the respective core sub-regions, which arrangement eliminates the necessity for the insertion of the control rod directly into an interior of the reactor core. It is therefore possible to safely steer clear of such a troublesome situation in which the spherical fuel pellets charged into the reactor core may be damaged by forcible insertion of the control rod. Thus, a weak point emphasized in the prior or monolithic type reactor can be obviated.

The top reflector can be constructed astride both of the side reflector and of the partition wall of the reflector. This arrangement is advantageous because of an increase in the designing tolerance in terms of anti-seismic properties.

The side reflector and the partition wall which cooperate to constitute the reflector are constructed in the form of the integral block-layered structure of the graphite reflector blocks joined with the keys. The inter-block restricting means releasable by the operation from outside are embedded into parts of the reflector blocks. With this arrangement, if the graphite reflector blocks are damaged due to the excessive irradiation of the high-speed neutrons during the reactor operation, the restrictions between the blocks are released by the manipulating the restricting means from outside of the reactor. Thus, the reflector blocks are taken one by one outside the reactor, and the damaged blocks can be replaced. As a result, the maintenance and repair of the reactor becomes practical.

We claim:

1. A multi-region high temperature nuclear reactor utilizing fuel in the form of spherical fuel pellets through which coolant gas is conducted and then gives up its heat to steam generating means, said reactor comprising, in combination:

means including a substantially circular outer reflector wall and at least two partition walls integral with the outer wall and extending substantially radially from the center of the outer wall for dividing the volume defined by the outer wall into at least two chambers for containing a respective bed of fuel pellets and forming the core of a respective separate reactor, each wall comprising a layered structure of graphite reflector blocks and including a tapered key removably wedged between two adjacent blocks of each layer for forcing adjacent blocks of the layer against one another to secure them together and which when removed releases the force and permits removal and replacement of a single block, fuel charging and discharging means for each reactor, separate steam generating means for each reactor, means defining separate paths for flow of gas through the bed of fuel elements of respective reactors and to the steam generating means for that reactor, and a plurality of control rods positioned at spaced locations within said outer wall and said partition walls for individual up and down movement relative to said walls for controlling each reactor independently.

2. A pebble bed high temperature gas reactor in which coolant gas is conducted through a reactor core consisting of a bed of spherical fuel pellets surrounded by a closed reflector wall housed within a pressure vessel, wherein the reflector wall comprises:

a layered structure comprising a plurality of layers of reflector blocks which in each layer are disposed in side-by-side relationship, and a tapered key removably wedged between adjacent blocks of a layer for normally forcing adjacent blocks of such layers against one another for securing them together and which when removed releases the force for permitting removal and replacement of a single block.

* * * * *